United States Patent
Zhang

(10) Patent No.: US 10,854,148 B2
(45) Date of Patent: Dec. 1, 2020

(54) METHOD AND SYSTEM OF CONTROLLING BACKLIGHT DRIVING

(71) Applicant: SHENZHEN CHINA STAR OPTOELECTRONICS SEMICONDUCTOR DISPLAY TECHNOLOGY CO., LTD., Shenzhen (CN)

(72) Inventor: Xianming Zhang, Shenzhen (CN)

( * ) Notice: Subject to any disclaimer, the term of this patent is extended or adjusted under 35 U.S.C. 154(b) by 56 days.

(21) Appl. No.: 16/306,586

(22) PCT Filed: Aug. 22, 2018

(86) PCT No.: PCT/CN2018/101781
§ 371 (c)(1),
(2) Date: Dec. 3, 2018

(87) PCT Pub. No.: WO2020/024344
PCT Pub. Date: Feb. 6, 2020

(65) Prior Publication Data
US 2020/0066213 A1    Feb. 27, 2020

(51) Int. Cl.
*G09G 3/34* (2006.01)
*H05B 45/46* (2020.01)
*H05B 45/37* (2020.01)

(52) U.S. Cl.
CPC ............ *G09G 3/342* (2013.01); *H05B 45/37* (2020.01); *H05B 45/46* (2020.01)

(58) Field of Classification Search
None
See application file for complete search history.

(56) References Cited

U.S. PATENT DOCUMENTS

| | | | |
|---|---|---|---|
| 8,237,700 B2 * | 8/2012 | Zhao | H05B 45/46 345/213 |
| 2010/0001944 A1 | 1/2010 | Seong et al. | |
| 2011/0121761 A1 | 5/2011 | Zhao | |
| 2011/0221795 A1 | 9/2011 | Ran et al. | |
| 2011/0279043 A1 | 11/2011 | Hagino | |
| 2012/0098869 A1 | 4/2012 | Tseng | |
| 2016/0374184 A1 | 12/2016 | Zhang | |

FOREIGN PATENT DOCUMENTS

| | | |
|---|---|---|
| CN | 101547540 A | 9/2009 |
| CN | 101621870 A | 1/2010 |
| CN | 102237040 A | 11/2011 |
| CN | 102458021 A | 5/2012 |
| CN | 102737602 A | 10/2012 |
| CN | 103280189 A | 9/2013 |
| CN | 205751478 U | 11/2016 |

* cited by examiner

*Primary Examiner* — Duane N Taylor, Jr.

(57) ABSTRACT

The present disclosure proposes a method and a system of controlling backlight driving. The method includes receiving an initial-pulse-width modulating signal and outputting a corresponding pulse-width modulating signal according to the initial-pulse-width modulating signal. The pulse-width modulating signal is used to control a corresponding LED string to illuminate. A cycle of each of the pulse-width modulating signals is the same with a predetermined phase difference.

12 Claims, 5 Drawing Sheets

METHOD AND SYSTEM OF CONTROLLING BACKLIGHT DRIVING

BACKGROUND

1. Field of the Disclosure

The present disclosure relates to the technical field of backlight controlling, and more particularly, to a method of controlling backlight driving and a system relating to the backlight driving.

2. Description of the Related Art

With the development of the liquid crystal display (LCD) technology, an LCD has become an important display tool, and dynamic backlighting is widely applied to the LCD. The LCD drives a backlight source with the dynamic backlighting controlling technology so that images can be successfully displayed on the backlight source.

FIG. 1 is a schematic diagram of the structure of a backlight driving system 100 of the related art. The backlight driving system 100 includes a main controlling device 10, a backlight controlling circuit 20, a voltage conversion circuit 30, and a plurality of light-emitting diode (LED) strings 40. FIG. 2 is a timing diagram of a pulse-width modulating signal output by the backlight controlling circuit 20, which is illustrated in FIG. 1.

When each channel (i.e., the LED string) receives the pulse-width modulating signal, the voltage conversion circuit 30 is in an operating state, and a driving circuit for the backlight driving system 100 is in a continuous conduction mode (CCM). When the voltage conversion circuit 30 is in a non-operating state, the driving circuit for the backlight driving system 100 is in a discontinuous conduction mode (DCM). In other words, the inductive current in the voltage conversion circuit 30 will undergo a certain change in the operating state and the non-operating state. A variation of the inductive current in a single channel is set as I here. In the present embodiment, a variation of the inductive current ranges from zero to 4I.

When only one of the channels is active, the variation of the inductive current ranges from zero to I. When two of the channels are active, the variation of the inductive current ranges from I to 2I. When three of the channels are active, the variation of the inductive current ranges from 2I to 3I. When four of the channels are active, the variation of the inductive current ranges from 3I to 4I. In a practical application, the number of channels in a backlight driving system 100 is large, and the inductive current is induced in vast numbers as well.

SUMMARY

The present disclosure proposes a method of controlling backlight driving and a system of the backlight driving to solve technical problems of the related art such as interference of an electromagnetic field in the backlight driving system of the related art in the circuit and the noise.

In a first aspect of the present disclosure, a method of controlling backlight driving configured to control a plurality of light-emitting diode (LED) strings in parallel in a backlight driving system to illuminate is provided. The method of controlling backlight driving includes: receiving an initial-pulse-width modulating signal; outputting a corresponding pulse-width modulating signal according to the initial-pulse-width modulating signal; the pulse-width modulating signal being configured to control a corresponding LED string to illuminate. A cycle of each of the pulse-width modulating signals is the same with a predetermined phase difference.

According to one embodiment of the present disclosure, the backlight driving system comprises N channels. Each of the N channels corresponds to a group of the LED strings. The corresponding pulse-width modulating signal is output according to the initial-pulse-width modulating signal. The pulse-width modulating signal is configured to control a corresponding LED string to illuminate. The method includes: at $t=(i-1)*T/N$, outputting an ith pulse-width modulating signal to control a group of the LED strings to illuminate according to the initial-pulse-width modulating signal; at $t=(j-1)*T/N$, outputting a jth pulse-width modulating signal to control another group of the LED strings to illuminate according to the initial-pulse-width modulating signal. A phase difference between the ith pulse-width modulating signal and the jth pulse-width modulating signal is $(j-1)*T/N$ where $1 \leq i < j \leq N$ stands, and i, j, and N are all positive integers.

According to one embodiment of the present disclosure, the method further comprises: at $t=0$, outputting a first pulse-width modulating signal to control a group of the LED strings to illuminate according to the initial-pulse-width modulating signal. A phase difference between the first pulse-width modulating signal and the initial-pulse-width modulating signal is zero.

According to one embodiment of the present disclosure, the backlight driving system comprises a first LED string, a second LED string, a third LED string, and a fourth LED string. The method includes: at $t=0$, outputting a first pulse-width modulating signal to control the first LED string to illuminate according to the initial-pulse-width modulating signal; at $t=T/4$, outputting a second pulse-width modulating signal to control the second LED string to illuminate according to the initial-pulse-width modulating signal; at $t=2T/4$, outputting a third pulse-width modulating signal to control the third LED string to illuminate according to the initial-pulse-width modulating signal; at $t=3T/4$, outputting a fourth pulse-width modulating signal to control the fourth LED string to illuminate according to the initial-pulse-width modulating signal.

According to one embodiment of the present disclosure, the method further comprises: collecting a value of a current for each group of the LED strings, and outputting sampling data; adjusting a backlight driving voltage corresponding to each group of the LED strings according to the sampling data.

In a second aspect of the present disclosure, a backlight driving system comprises a main controlling device and a backlight controlling circuit. The main controlling device is configured to output an initial-pulse-width modulating signal. The backlight controlling circuit is configured to output a corresponding pulse-width modulating signal according to the initial-pulse-width modulating signal to drive a corresponding light-emitting diode (LED) light string to illuminate. A cycle of each of the pulse-width modulating signals is the same with a predetermined phase difference.

According to one embodiment of the present disclosure, the backlight driving system further comprises a power source and a voltage conversion circuit. The a voltage conversion circuit is configured to receive an output voltage imposed on the power source and a voltage modulating signal of the backlight controlling circuit and convert the output voltage imposed on the power source into the backlight driving voltage which drives the LED string to illuminate according to the voltage modulating signal.

According to one embodiment of the present disclosure, the backlight driving system comprises N channels. Each of the N channels corresponds to a group of the LED strings. The backlight controlling circuit comprises a first LED driving unit and a second LED driving unit. At t=(i−1)*T/N, an ith pulse-width modulating signal is output by the first LED driving unit according to the initial-pulse-width modulating signal to control a group of the LED strings to illuminate. At t=(j−1)*T/N, a jth pulse-width modulating signal is output by the second LED driving unit according to the initial-pulse-width modulating signal to control another group of the LED strings to illuminate. The phase difference between the ith pulse-width modulating signal and the jth pulse-width modulating signal is t=(j−1)*T/N; 1≤i<j≤N stands; i, j, and N are all positive integers.

According to one embodiment of the present disclosure, at t=0, a first pulse-width modulating signal is output according to the initial-pulse-width modulating signal to control the first LED string to illuminate. The phase difference between the first pulse-width modulating signal and the initial-pulse-width modulating signal is zero.

According to one embodiment of the present disclosure, the backlight driving system further comprises a sampling circuit, configured to collect a value of a current in each group of the LED strings and output sampling data.

In a third aspect of the present disclosure, a method of controlling backlight driving configured to control a plurality of light-emitting diode (LED) strings in parallel in a backlight driving system to illuminate is provided. The method of controlling backlight driving includes: receiving an initial-pulse-width modulating signal; at t=(i−1)*T/N, outputting an ith pulse-width modulating signal to control a group of the LED strings to illuminate according to the initial-pulse-width modulating signal; at t=(j−1)*T/N, outputting a jth pulse-width modulating signal to control another group of the LED strings to illuminate according to the initial-pulse-width modulating signal. A phase difference between the ith pulse-width modulating signal and the jth pulse-width modulating signal is (j−1)*T/N where 1≤i<j≤N stands, and i, j, and N are all positive integers.

According to one embodiment of the present disclosure, the method further comprises: at t=0, outputting a first pulse-width modulating signal to control a group of the LED strings to illuminate according to the initial-pulse-width modulating signal. A phase difference between the first pulse-width modulating signal and the initial-pulse-width modulating signal is zero.

According to one embodiment of the present disclosure, the backlight driving system comprises a first LED string, a second LED string, a third LED string, and a fourth LED string. The method includes: at t=0, outputting a first pulse-width modulating signal to control the first LED string to illuminate according to the initial-pulse-width modulating signal; at t=T/4, outputting a second pulse-width modulating signal to control the second LED string to illuminate according to the initial-pulse-width modulating signal; at t=2T/4, outputting a third pulse-width modulating signal to control the third LED string to illuminate according to the initial-pulse-width modulating signal; at t=3T/4, outputting a fourth pulse-width modulating signal to control the fourth LED string to illuminate according to the initial-pulse-width modulating signal.

According to one embodiment of the present disclosure, the method further comprises: collecting a value of a current for each group of the LED strings, and outputting sampling data; adjusting a backlight driving voltage corresponding to each group of the LED strings according to the sampling data.

The present disclosure brings beneficial effects as follows: A phase difference is predetermined for a pulse-width modulating signal received through each of the channels in the backlight driving system so that the LED strings of each of the channels are turned on in a time-sharing manner, thereby avoiding the sharp change of the current in the backlight driving system and reducing interference of an electromagnetic field in the backlight driving system in the circuit and the noise of the backlight driving system.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE EMBODIMENTS

In the disclosure, it is should be understood that spatially relative terms, such as "center", "longitudinal", "lateral", "length", "width", "above", "below", "front", "back", "left", "right", "horizontal", "vertical", "top", "bottom", "inner", "outer", "clockwise", "counterclockwise", "axial", "radial", "circumferential", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The spatially relative terms are not limited to specific orientations depicted in the figures.

Figure 1:
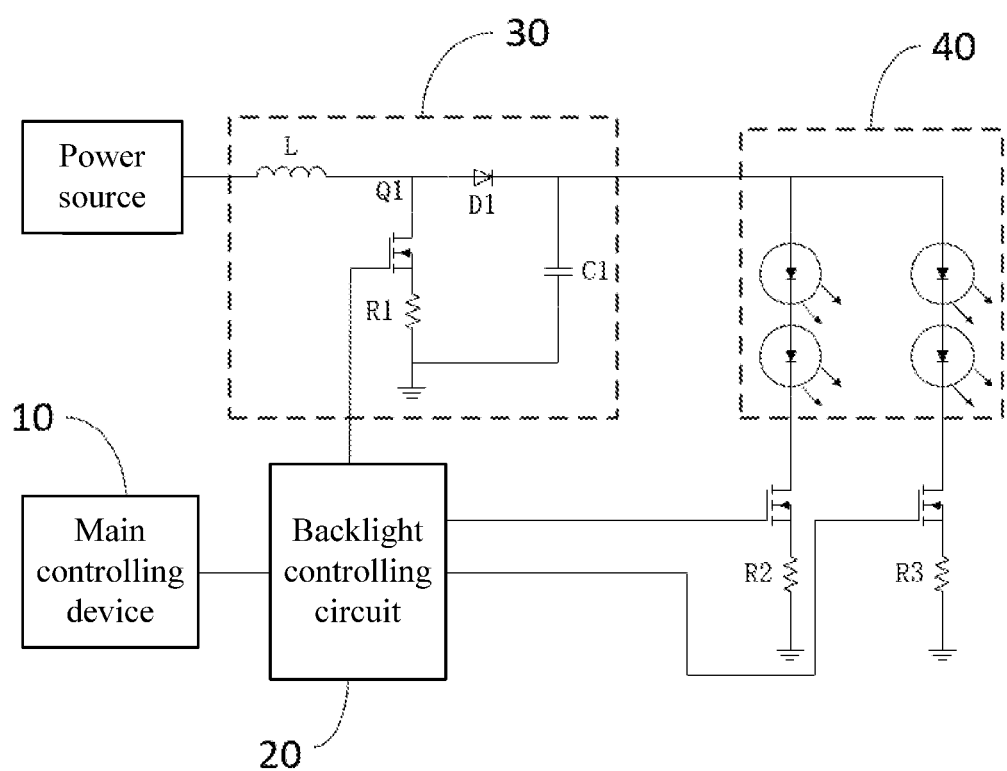
FIG. 1 is a schematic diagram of the structure of a backlight driving system of the related art.
Figure 2:
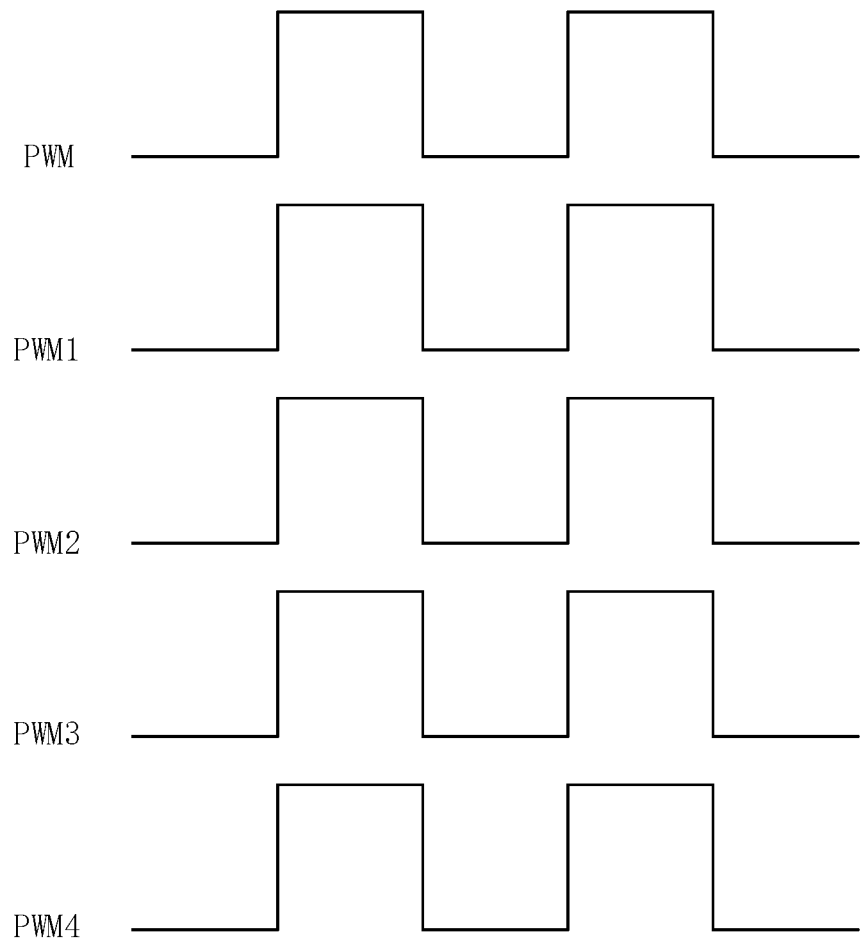
FIG. 2 is a timing diagram of a pulse-width modulating signal output by the backlight controlling circuit illustrated in FIG. 1.
Figure 3:
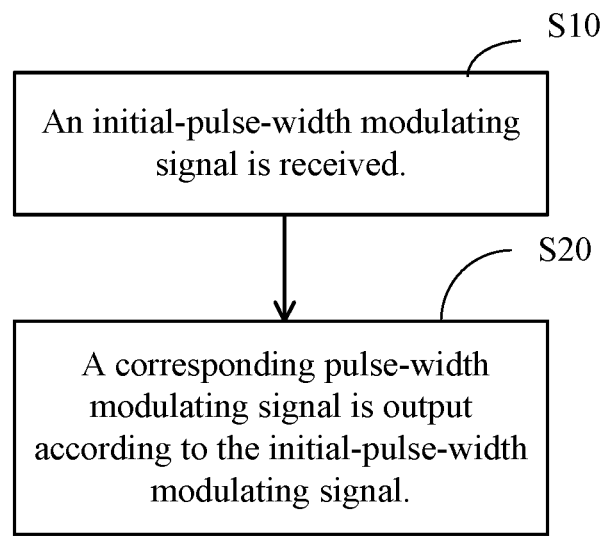
FIG. 3 is a flowchart of a method of controlling backlight driving according to an embodiment of the present disclosure.

FIG. 3 is a flowchart of a method of controlling backlight driving according to an embodiment of the present disclosure. The method of controlling backlight driving includes blocks as follows.

At block S10, an initial-pulse-width modulating signal is received.

At block S20, a corresponding pulse-width modulating signal is output according to the initial-pulse-width modulating signal. The pulse-width modulating signal is configured to control a corresponding light-emitting diode (LED) light string to illuminate.

In another embodiment of the present disclosure, the backlight driving system includes N channels. Each of the N channels corresponds to a group of the LED strings. At the moment of t=0, a main controlling device outputs an initial-pulse-width modulating signal. While at the moment of t>0, a corresponding pulse-width modulating signal is output according to the initial-pulse-width modulating signal. The pulse-width modulating signal is configured to control a corresponding LED string to illuminate. The cycle of each of the pulse-width modulating signals is the same with a predetermined phase difference.

At t=(i−1)*T/N, an ith pulse-width modulating signal is output according to the initial-pulse-width modulating signal to control a group of the LED strings to illuminate. At t=(j−1)*TIN, a jth pulse-width modulating signal is output according to the initial-pulse-width modulating signal to control another group of the LED strings to illuminate. The phase difference between the ith pulse-width modulating signal and the jth pulse-width modulating signal is (j−1)*T/N where 1≤i<j≤N stands and i, j, and N are all positive integers.

Further, at t=0, a first pulse-width modulating signal is output according to the initial-pulse-width modulating signal to control a group of the LED strings to illuminate. The phase difference between the first pulse-width modulating signal and the initial-pulse-width modulating signal is zero.

Figure 4:
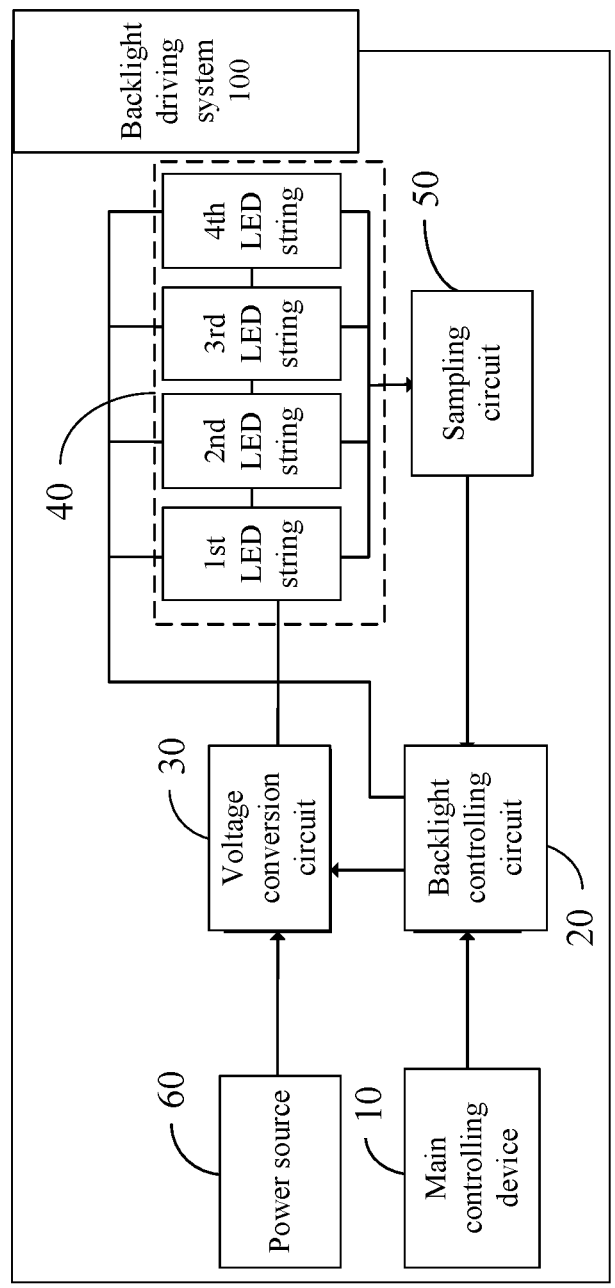
FIG. 4 illustrates a block diagram of a backlight driving system according to an embodiment of the present disclosure.

As illustrated in FIG. 4, the backlight driving system includes a main controlling device 10, a backlight controlling circuit 20, a voltage conversion circuit 30, an LED string group 40, and a power source 60. The LED string group 40 includes a first LED string, a second LED string, a third LED string, and a fourth LED string.

In this embodiment, the backlight driving system includes four channels. Each of the channels corresponds to one of the pulse-width modulating signals. For example, the first channel (a first LED string 401) receives the first pulse-width modulating signal PWM1. The second channel (a second LED string 402) receives the second pulse-width modulating signal PWM2. The third channel (a third LED string 403) receives the third pulse-width modulating signal PWM3. The fourth channel (a fourth LED string 404) receives a fourth pulse-width modulating signal PWM4. Another example is as follows.

The first channel receives the fourth pulse-width modulating signal PWM4. The second channel receives the third pulse-width modulating signal PWM3. The third channel receives the second pulse-width modulating signal PWM2. The fourth channel receives the first pulse-width modulating signal PWM1. The present disclosure is not limited to the above-mentioned corresponding solutions.

Figure 5:
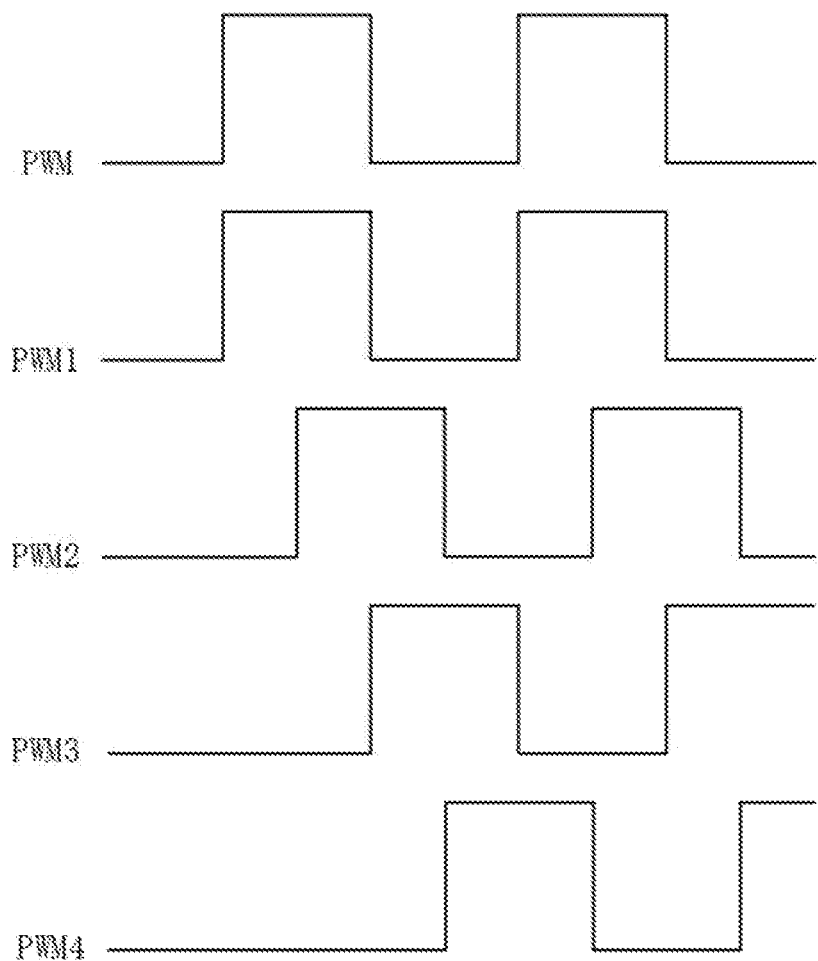
FIG. 5 is a timing diagram of a pulse-width modulating signal output by the backlight controlling circuit illustrated in FIG. 4.

FIG. 5 is a timing diagram of a pulse-width modulating signal output by the backlight controlling circuit 20, which is illustrated in FIG. 4. At t=0, the first pulse-width modulating signal PWM1 is output according to the initial-pulse-width modulating signal to control the first LED string to illuminate. At t=T/4, the second pulse-width modulating signal PWM2 is output according to the initial-pulse-width modulating signal to control the second LED string to illuminate. At t=2T/4, the third pulse-width modulating signal PWM3 is output according to the initial-pulse-width modulating signal to control the third LED string to illuminate. At t=3T/4, the fourth pulse-width modulating signal PWM4 is output according to the initial-pulse-width modulating signal to control the fourth LED string to illuminate.

Further, the location of the channel does not necessarily correspond to the corresponding received pulse-width modulating signal as long as the cycle of delay of the pulse-width modulating signal received by each of the channels is inconsistent. For example, the pulse-width modulating signal in the first channel is delayed by three-fourths of the cycle. The pulse-width modulating signal in the second channel is delayed by zero cycles. The pulse-width modulating signal in the third channel is delayed by one-fourth of the cycle. The pulse-width modulating signal in the fourth channel is delayed by two-fourths of the cycle.

The voltage conversion circuit 30 generates an inductive current I when a channel receives a corresponding pulse-width modulating signal. When another channel receives a corresponding pulse-width modulating signal, the voltage conversion circuit 30 also generates the inductive current I. Since the two channels receive their corresponding pulse-width modulating signal at different period of time, the generated inductive currents are not superimposed. According to the pulse-width modulating signal output by each of the channels correspondingly as mentioned above, the backlight driving system generates an inductive current I. The LED strings in each of the channels are turned on in a time-sharing manner, thereby avoiding the sharp change of the current in the backlight driving system and reducing interference of an electromagnetic field in the circuit in the backlight driving system and the noise of the backlight driving system.

Figure 6:
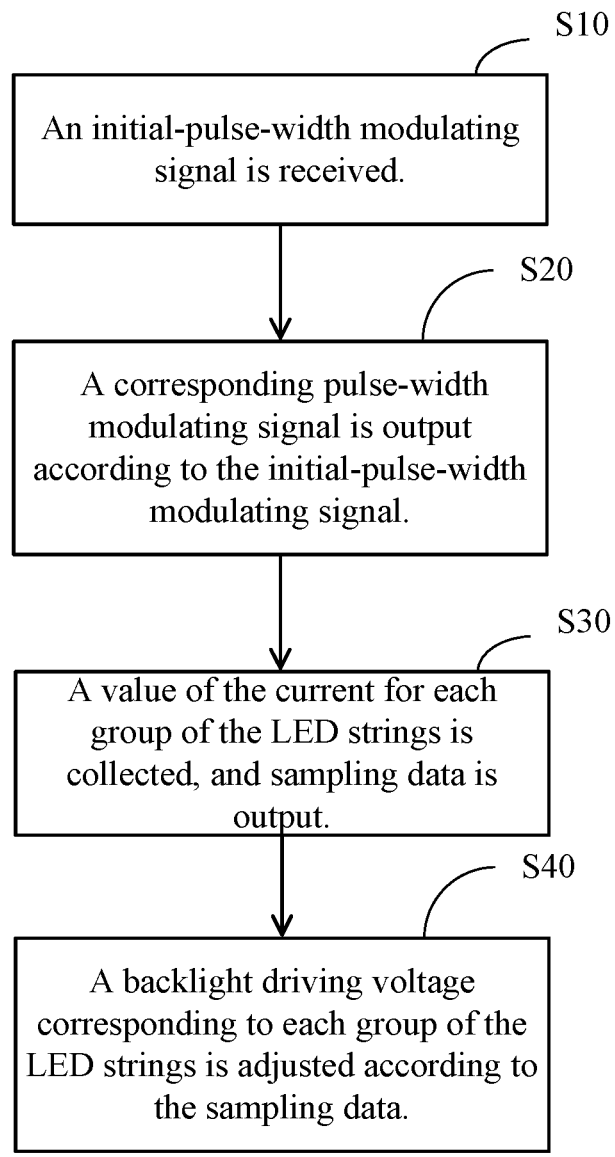
FIG. 6 is a flowchart of a method of controlling backlight driving according to another embodiment of the present disclosure.

As illustrated in FIG. 6, the method of controlling backlight driving of the present disclosure further includes following blocks.

At block S30, a value of the current for each group of the LED strings is collected, and sampling data is output.

At block S40, a backlight driving voltage corresponding to each group of the LED strings is adjusted according to the sampling data.

In the embodiment of the present disclosure, the backlight driving system includes, but is not limited to, four channels (the number of channels is the same as the number of LED strings), and each channel corresponds to a resistant module (not shown) with the same resistant value. In this embodiment, the resistant module is configured to detect the current in each of the channels; that is, the region can be regarded as the sampling circuit 50.

The current in the channel is detected by the resistant module in the channel, and the sampling data in each of the channels is output to the backlight driving module 20. The backlight driving module 20 inputs a voltage modulating signal to the voltage conversion circuit 30 according to the sampling data to adjust the backlight driving voltage output by the voltage conversion circuit 30 to ensure that the current in each of the channels is constant.

When the sampled data voltage is greater than a reference voltage, the backlight controlling circuit 20 outputs a controlling signal to force the voltage conversion circuit 30 to lower the backlight driving voltage, thereby reducing the current in the channel. On the contrary, the backlight controlling circuit 20 outputs a controlling signal to force the voltage conversion circuit 30 to raise the backlight driving voltage, thereby increasing the current in the channel. In another embodiment, a voltage conversion circuit 30 is, but not limited to, a Boost boost circuit.

As illustrated in FIG. 4, the present disclosure further proposes a backlight driving system 100. The backlight driving system 100 includes a main controlling device 10, a backlight controlling circuit 20, a voltage conversion circuit 30, a power source 60, and an LED string group 40.

The main controlling device 10 is configured to output an initial-pulse-width modulating signal and transmit the initial-pulse-width modulating signal to the backlight controlling circuit 20.

The backlight controlling circuit 20 is configured to output a corresponding pulse-width modulating signal and an output voltage imposed on a receiving power source according to the initial-pulse-width modulating signal PWM to drive the corresponding LED string to illuminate. As illustrated in FIG. 5, the cycle of each of the pulse-width modulating signals (PWM1~PWM4 in FIG. 5) is the same with a predetermined phase difference.

Further, the backlight driving system 100 includes a voltage conversion circuit 30 and a power source 60.

The voltage conversion circuit 30 is configured to receive an output voltage imposed on the power source and a voltage modulating signal of the backlight controlling circuit 20. Besides, the voltage conversion circuit 30 converts an output voltage imposed on the power source 60 into the backlight driving voltage which drives the LED string to illuminate according to the voltage modulating signal.

The backlight driving system 100 includes N channels. Each of the N channels corresponds to a group of the LED strings. The backlight controlling circuit 20 includes a first LED driving unit and a second LED driving unit.

At $t=(i-1)*T/N$, an ith pulse-width modulating signal is output by the first LED driving unit according to the initial-pulse-width modulating signal to control a group of the LED strings to illuminate. At $t=(j-1)*T/N$, a jth pulse-width modulating signal is output by the second LED driving unit according to the initial-pulse-width modulating signal to control another group of the LED strings to illuminate. The phase difference between the ith pulse-width modulating signal and the jth pulse-width modulating signal is $t=(j-1)*T/N$ where $1 \leq i < j \leq N$ stands and i, j, and N are all positive integers.

At $t=0$, the first LED driving unit outputs the first pulse-width modulating signal PWM1 according to the initial-pulse-width modulating signal to control a group of the LED strings to illuminate. The phase difference between the first pulse-width modulating signal PWM1 and the initial-pulse-width modulating signal is zero.

Further, the LED string group 40 includes a first LED string, a second LED string, a third LED string, and a fourth LED string. At $t=0$, the first pulse-width modulating signal PWM1 is output according to the initial-pulse-width modulating signal to control the first LED string to illuminate. At $t=T/4$, a second pulse-width modulating signal PWM2 is output according to the initial-pulse-width modulating signal to control the second LED string to illuminate. At $t=2T/4$, a third pulse-width modulating signal PWM3 is output according to the initial-pulse-width modulating signal to control the third LED string to illuminate. At $t=3T/4$, a fourth pulse-width modulating signal PWM4 is output according to the initial-pulse-width modulating signal to control the fourth LED string to illuminate.

Further, the location of the channel does not necessarily correspond to the corresponding received pulse-width modulating signal as long as the cycle of delay of the pulse-width modulating signal received by each channel is inconsistent. For example, the pulse-width modulating signal in the first channel is delayed by three-fourths of the cycle. The pulse-width modulating signal in the second channel is delayed by zero cycles. The pulse-width modulating signal in the third channel is delayed by one-fourth of the cycle. The pulse-width modulating signal in the fourth channel is delayed by two-fourths of the cycle.

Further, the backlight driving system 100 includes a sampling circuit 50. The sampling circuit 50 is configured to collect the value of the current in each of the groups of the LED strings and output sampling data. In other words, the current in the channel is detected by the resistant module in the channel, and the sampling data in each of the channels is output to the backlight driving module 20. The backlight driving module 20 inputs a voltage modulating signal to the voltage conversion circuit 30 according to the sampling data to adjust the backlight driving voltage output by the voltage conversion circuit 30 to ensure that the current in each of the channels is constant.

The present disclosure proposes a method and a system of controlling backlight driving. The method includes receiving an initial-pulse-width modulating signal and outputting a corresponding pulse-width modulating signal according to the initial-pulse-width modulating signal. The pulse-width modulating signal is used to control a corresponding LED string to illuminate. A cycle of each of the pulse-width modulating signals is the same with a predetermined phase difference. The present disclosure brings beneficial effects as follows: A phase difference is predetermined for a pulse-width modulating signal received through each of the channels in the backlight driving system so that the LED strings of each of the channels are turned on in a time-sharing manner, thereby avoiding the sharp change of the current in the backlight driving system and reducing interference of an electromagnetic field in the backlight driving system in the circuit and the noise of the backlight driving system.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A method of controlling backlight driving, configured to control a plurality of light-emitting diode (LED) strings in parallel in a backlight driving system to illuminate; the method of controlling backlight driving comprising:
receiving an initial-pulse-width modulating signal;
outputting a corresponding pulse-width modulating signal according to the initial-pulse-width modulating signal; the pulse-width modulating signal being configured to control a corresponding LED string to illuminate;
wherein a cycle of each of the pulse-width modulating signals is the same with a predetermined phase difference,
wherein the backlight driving system comprises N channels; each of the N channels corresponds to a group of the LED strings; the corresponding pulse-width modulating signal is output according to the initial-pulse-width modulating signal; the pulse-width modulating signal is configured to control a corresponding LED string to illuminate; the method comprises:
at $t=(i-1)*T/N$, outputting an ith pulse-width modulating signal to control a group of the LED strings to illuminate according to the initial-pulse-width modulating signal;
at $t=(j-1)*T/N$, outputting a jth pulse-width modulating signal to control another group of the LED strings to illuminate according to the initial-pulse-width modulating signal;

wherein a phase difference between the ith pulse-width modulating signal and the jth pulse-width modulating signal is (j−i)*T/N where 1≤i<j≤N stands, and i, j, and N are all positive integers.

2. The method of claim 1, further comprising:
at t=0, outputting a first pulse-width modulating signal to control a group of the LED strings to illuminate according to the initial-pulse-width modulating signal;
wherein a phase difference between the first pulse-width modulating signal and the initial-pulse-width modulating signal is zero.

3. The method of claim 1, wherein the backlight driving system comprises a first LED string, a second LED string, a third LED string, and a fourth LED string;
at t=0, outputting a first pulse-width modulating signal to control the first LED string to illuminate according to the initial-pulse-width modulating signal;
at t=T/4, outputting a second pulse-width modulating signal to control the second LED string to illuminate according to the initial-pulse-width modulating signal;
at t=2T/4, outputting a third pulse-width modulating signal to control the third LED string to illuminate according to the initial-pulse-width modulating signal;
at t=3T/4, outputting a fourth pulse-width modulating signal to control the fourth LED string to illuminate according to the initial-pulse-width modulating signal.

4. The method of claim 1, further comprising:
collecting a value of a current for each group of the LED strings, and outputting sampling data;
adjusting a backlight driving voltage corresponding to each group of the LED strings according to the sampling data.

5. A backlight driving system, comprising:
a main controlling device, configured to output an initial-pulse-width modulating signal;
a backlight controlling circuit, configured to output a corresponding pulse-width modulating signal according to the initial-pulse-width modulating signal to drive a corresponding light-emitting diode (LED) light string to illuminate;
a power source; and
a voltage conversion circuit, configured to receive an output voltage imposed on the power source and a voltage modulating signal of the backlight controlling circuit and convert the output voltage imposed on the power source into the backlight driving voltage which drives the LED string to illuminate according to the voltage modulating signal;
wherein a cycle of each of the pulse-width modulating signals is the same with a predetermined phase difference.

6. The backlight driving system of claim 5, wherein the backlight driving system comprises N channels; each of the N channels corresponds to a group of the LED strings; the backlight controlling circuit comprises a first LED driving unit and a second LED driving unit;
at t=(i−1)*T/N, an ith pulse-width modulating signal is output by the first LED driving unit according to the initial-pulse-width modulating signal to control a group of the LED strings to illuminate;
at t=(j−1)*T/N, a jth pulse-width modulating signal is output by the second LED driving unit according to the initial-pulse-width modulating signal to control another group of the LED strings to illuminate;
the phase difference between the ith pulse-width modulating signal and the jth pulse-width modulating signal is t=(j−1)*T/N; 1≤i<j≤N stands; i, j, and N are all positive integers.

7. The backlight driving system of claim 6, wherein at t=0, a first pulse-width modulating signal is output according to the initial-pulse-width modulating signal to control the first LED string to illuminate;
the phase difference between the first pulse-width modulating signal and the initial-pulse-width modulating signal is zero.

8. The backlight driving system of claim 7, wherein the backlight driving system further comprises:
a sampling circuit, configured to collect a value of a current in each group of the LED strings and output sampling data.

9. A method of controlling backlight driving, configured to control a plurality of light-emitting diode (LED) strings in parallel in a backlight driving system to illuminate; the method of controlling backlight driving comprising:
receiving an initial-pulse-width modulating signal;
at t=(i−1)*T/N, outputting an ith pulse-width modulating signal to control a group of the LED strings to illuminate according to the initial-pulse-width modulating signal;
at t=(j−1)*T/N, outputting a jth pulse-width modulating signal to control another group of the LED strings to illuminate according to the initial-pulse-width modulating signal;
wherein a cycle of each of the pulse-width modulating signals is the same with a predetermined phase difference, and a phase difference between the ith pulse-width modulating signal and the jth pulse-width modulating signal is (j−i)*T/N where 1≤i<j≤N stands, and i, j, and N are all positive integers.

10. The method of claim 9, further comprising:
at t=0, outputting a first pulse-width modulating signal to control a group of the LED strings to illuminate according to the initial-pulse-width modulating signal,
wherein a phase difference between the first pulse-width modulating signal and the initial-pulse-width modulating signal is zero.

11. The method of claim 9, wherein the backlight driving system comprises a first LED string, a second LED string, a third LED string, and a fourth LED string;
at t=0, outputting a first pulse-width modulating signal to control the first LED string to illuminate according to the initial-pulse-width modulating signal;
at t=T/4, outputting a second pulse-width modulating signal to control the second LED string to illuminate according to the initial-pulse-width modulating signal;
at t=2T/4, outputting a third pulse-width modulating signal to control the third LED string to illuminate according to the initial-pulse-width modulating signal;
at t=3T/4, outputting a fourth pulse-width modulating signal to control the fourth LED string to illuminate according to the initial-pulse-width modulating signal.

12. The method of claim 9, further comprising:
collecting a value of a current for each group of the LED strings, and outputting sampling data; and
adjusting a backlight driving voltage corresponding to each group of the LED strings according to the sampling data.

* * * * *

UNITED STATES PATENT AND TRADEMARK OFFICE
CERTIFICATE OF CORRECTION

Page 1 of 1

PATENT NO. : 10,854,148 B2
APPLICATION NO. : 16/306586
DATED : December 1, 2020
INVENTOR(S) : Xianming Zhang It is certified that error appears in the above-identified patent and that said Letters Patent is hereby corrected as shown below:

On the Title Page

Item [30], insert --Chinese Patent Application No. 201810874797.6--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*